United States Patent [19]

Stowell

[11] Patent Number: 4,696,284

[45] Date of Patent: Sep. 29, 1987

[54] SOLAR HEATED CANTEEN

[76] Inventor: Dennis E. Stowell, P.O. Box 796, Parowan, Utah 84761

[21] Appl. No.: 937,685

[22] Filed: Dec. 4, 1986

Related U.S. Application Data

[63] Continuation-in-part of Ser. No. 826,802, Feb. 6, 1986, abandoned.

[51] Int. Cl.⁴ ............................................. F24J 3/02
[52] U.S. Cl. .................................. 126/437; 126/450; 126/444; 126/440
[58] Field of Search ............... 126/437, 440, 417, 451, 126/444, 450; 215/260

[56] References Cited

U.S. PATENT DOCUMENTS

| | | | |
|---|---|---|---|
| 4,116,223 | 9/1978 | Vasilantone | 126/440 X |
| 4,239,032 | 12/1980 | Irving | 126/437 |
| 4,299,201 | 11/1981 | Tsubota | 126/440 |
| 4,557,251 | 12/1985 | Burkhardt | 126/437 X |
| 4,566,434 | 1/1986 | Lindenbauer | 126/440 |

*Primary Examiner*—Larry Jones
*Attorney, Agent, or Firm*—Norman B. Rainer

[57] ABSTRACT

A canteen-like apparatus which confines potable water is adapted to heat the water by solar energy. The apparatus has a water-confining vessel substantially surrounded by a thermally insulating jacket. The vessel is comprised of an upper panel of spherical curvature convexly directed away from the interior of the vessel, and an opposed lower panel. A flat fresnel lens having a circular perimeter of larger diameter than the diameter of the transparent panel is attached at its perimeter to the insulating jacket and thereby disposed above the transparent panel to form an air chamber. Rays of sunlight pass through the fresnel lens and converge toward and impinge perpendicularly upon the upper panel, thereby producing efficient heating of the water.

7 Claims, 3 Drawing Figures

4,696,284

SOLAR HEATED CANTEEN

RELATED APPLICATIONS

This is a continuation-in-part application based upon U.S. patent application Ser. No. 826,802, filed Feb. 6, 1986, now abandoned.

BACKGROUND OF THE INVENTION

This invention concerns a small portable vessel, and more particularly relates to a canteen-like vessel in which water may be heated by exposure to solar radiation.

Portable solar heating units for campers are well known for cooking food and heating water. They are particularly useful where the buildings of a fire for heating purposes is impractical. Such units generally rely upon reflective parabolic surfaces which collect radiation over a relatively large area, and focus the radiation directly upon the object to be heated. In such instances, use of the apparatus usually requires that the camper set up several components in stationary juxtaposition, and wait in a fixed location until the heating task is accomplished. No storage or accumulation of the solar-generated heat is usually contemplated. The reflectors are usually fragile, or if durably constructed are expensive and bulky. U.S. Pat. No. 4,557,251 to Burkhardt discloses a portable and compact heating device which disposes water in very thin layers for quick heating. In the Burkhardt device, the rate of heating is such that a period of about one hour is required to raise the water to its boiling point for each half centimeter depth of water.

It is accordingly an object of this invention to provide a portable water confining apparatus capable of heating said confined water by solar radiation to boiling temperatures at a rate significantly faster than achievable by prior devices.

It is a further object of this invention to provide apparatus as in the foregoing object having a canteen-like configuration.

It is a still further object of this present invention to provide apparatus cable of accumulating heat of solar origin over a period of time.

It is yet another object of the invention to provide apparatus of the aforesaid nature of rugged, durable consturction which can be economically manufactured.

These objects and other objects and advantages of the invention will be apparent from the following description.

SUMMARY OF THE INVENTION

The above and other beneficial objects and advantages are accomplished in accordance with the present invention by an apparatus for confining a supply of water and enabling said water to be heated by solar radiation, said apparatus comprising:

(a) a water-confining vessel having an upper panel of spherically rounded contour convexly directed outwardly from the vessel and centered upon an axis perpendicular to said vessel, an opposed lower panel, a boundary edge of circular configuration joining said uppr and lower panels, and a sealable spout communicating with the interior of the vessel, (b) a jacket of self-supporting thermally insulative material, and comprised of (1) a bottom wall of circular perimeter adapted to lie in abutment with said lower panel, (2) a sidewall rising upwardly from the perimeter of said bottom wall as a continuous extension thereof and having an exterior surface extending between upper and lower extremities and an interior surface comprised of a lower portion which faces said vessel and abuts said boundary edge, and an upper portion disposed above the upper panel of the vessel and shaped as a conical section which tapers outwardly away from the vessel toward the upper extremity of said exterior surface, and (3) a channel which permits close-fitting passage of said spout, (c) a circular fresnel lens window of larger diameter than said vessel affixed at its perimeter to the upper extremity of said sidewall and coacting with the jacket to difine an air chamber above the vessel, said lens being perpendicularly centered upon the axis of the upper panel and having a focal length coinciding with the center curvature of said upper panel at a site on siad axis below the bottom wall of the jacket, whereby light rays passing through the fresnel lens converge to the area of the upper panel while passing through the air chamber, and, impinge perpendicularly upon the upper panel and heat the vessel, and (d) a carrying strap forming a substantially closed loop, a part of which embraces the exterior surface of said sidewall.

In preferred embodiments, a dial thermometer is associated with the vessel. The vessel may be fabricated of a metal, unbreakable glass polycarbonate or polyacrylate in which case, the vessel is preferably a monolithic structure. In certain embodiments, the lower panel of the vessel is of rounded contour convexly directed outwardly from the vessel, and joining with the upper panel at a circular boundary edge. In other embodiments, the lower panel of the vessel is flat, and is joined to the upper panel by a boundary edge panel of circular configuration perpendicularly disposed between said upper and lower panels.

The rays of light focused from the perimeter of the fresnel lens toward the vessel define a conical surface which is preferably tangent to the conical section of the interior surface of the sidewall. In certain embodiments the lens may be coated through it, or the window may be comprised of a magnifying lens other than a fresnel lens which concentrates solar rays in a manner similar to a fresnel lens.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 2:
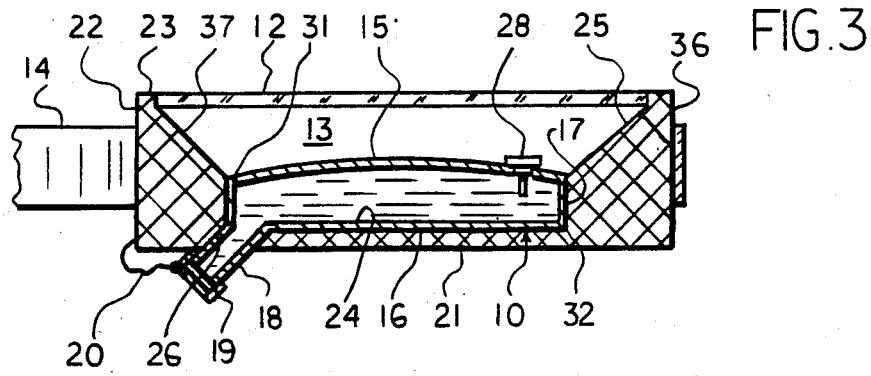
FIG. 2 is a sectional view taken along the line of 2—2 of FIG. 1.

For convenience in description, the terms "bottom" and "upper", or words of similar import, will have reference to the lower and upper extremities, respectively, of the apparatus as shown in FIG. 2. Similarly, the expressions "inner" and "exterior", or equivalents thereto will have reference to the geometric center of said apparatus.

DESCRIPTION OF THE PREFERRED EMBODIMENT

Referring to the drawing, an embodiment of the apparatus of this invention is shown comprised of water-confining vessel 10 emplaced within insulative jacket 11, circular flat fresnel lens window 12 coacting with said jacked to define air chamber 13, and carrying strap 14 associated with said jacket.

Figure 1:
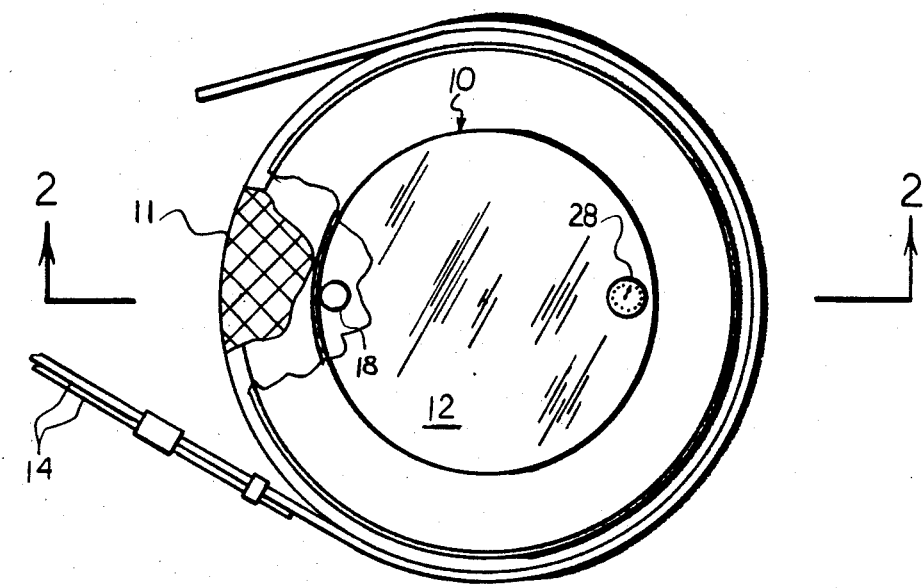
FIG. 1 is a top elevational view of an embodiment of the apparatus of this invention with portions broken away to reveal interior details.
Figure 3:
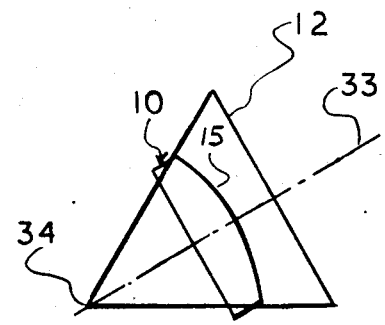
FIG. 3 is a schematic view showing critical geometrical features of the invention.

Vessel 10, preferably of integral construction, is comprised of upper panel 15, flat lower surface 16, and boundary panel 17 of circular cylindric configuration perpendicularly disposed between upper panel 15 and lower surface 16 and imperviously joined thereto at upper and lower boundary edges 31 and 32, respectively. In alternative embodiments, the vessel may be fabricated of upper and lower rounded portions joined in a single continuous boundary edge, thereby producing a vessel configuration without boundary 17. A spout 18 communicates with the interior of the vessel and is provided with sealing closure means in the form of a threaded cap 19 attached to jacket 11 by a tether line 20. A dial thermometer 28 is associated with the vessel so that the dial face is above upper panel 15. The volume of the vessel may range from about 1 to 4 quarts. Upper panel 15 has a spherical curvature convexly directed outwardly from the vessel and is disposed about a center axis 33 perpendicularly disposed to said vessel. The center of curvature of panel 15 is shown in FIG. 3 as a point 34 on the axis below the vessel, which is also the focal point of fresnel lens 12.

Insulative jacket 11, preferably fabricated of a closed cell foam of a polymer as polystyrene, polyethylene or polyurethane, is comprised of bottom wall 21 of circular perimeter, and sidewall 22 rising perpendicularly from said bottom wall to circular uper extremity 23 and bounded by interior and exterior surfaces 25 and 36, respectively.

The upwardly directed face 24 of bottom wall 21 is adapted to lie in gripping abutment with lower panel 16 of the vessel. The lower portion of interior surface 25 of sidewall 22 is adapted to lie in gripping abutment with boundary panel 17 of the vessel, whereby the vessel is securely held in place by the insulative jacket. The upper portion 37 of interior surface 25 is disposed above the upper panel of the vessel and tapers outwardly away from the vessel toward upper extremity 23 of the sidewall, thereby constituting a section of a conical surface taken perpendicularly transverse to the cone axis. A chamber 13, which is bounded by window panel 12, upper panel 15, and tapered upper portion 37 of the interior surface of the sidewall, is therefore caused to have substantially the shape of a transverse section of a cone. A channel 26 in bottom panel 21 permits penetrative passage of spout 18.

Window 12 is a flat fresnel lens of circular perimeter perpendicularly centered upon axis 33 and adhered at its perimeter in an impervious manner to upper extremity 23 of sidewall 22. The focal point of the fresnel lens is chosen to coincide with the radius of curvature of panel 15, as shown in FIG. 3. By virtue of such critical characteristic, all light rays gathered by the lens and concentrated inwardly toward the vessel strike upper panel 15 perpendicularly. This minimizes reflection of light from panel 15, a source of inefficiency of earlier solar collectors. Consequently, a very high percentage of the light impinging upon panel 15 heats the vessel.

The invention is further illustrated by the following example which is not intended to be limitave thereof.

EXAMPLE

A canteen-like appartus was utilized having a 14 inch diameter fresnel of 10 incy focal length adhered at its perimeter to a jacket of foamed polyethylene. The jacket has a circular sidewall of 4 inch height and 2 inch thickness at its lowermost extremity. A flat bottom wall of ¾ inch thickness joins the lowermost extremity of the sidewall.

A monolithic vessel fabricated of aluminum is positioned within the jacket. The vessel has a spherically curved upper panel having a radius of curvature of 8½ inches, a flat lower surface, and boundary panel of circular cylindric contour having a height of 178 inch. Said lower surface and boundary panel are in tight-fitting engagement with the jacket. The uppermost point of the upper panel is spaced 1½ inch from the lower surface of the fresnel lens.

When the afore described canteen, filled with a quart of water, is exposed to sunlight in a clear December day at 58 degrees F. ambinet temperature, the water is heated to boiling in 125 minutes.

Chamber 12 may contain a vacuum or gasses other than air for improved efficiency of conversion of the sun's rays into thermal energy. Upper panel 15 of said vessel, upon which the solar radiation impinges, may be provided with an energy-absorptive coating such as black copper oxide or equivalent coatings well known in the art. The fresnel lens may be coated with an anti-reflective coating to enhance transmission of light therethrough. Removable thermal insulative means may be associated with the outwardly disposed face of said window panel to retain heat within the canteen when sunlight is not entering the window.

Carrying strap 14, preferably of adjustable length, is attached to sidewall 22 in the general manner typical of a conventional canteen. By virtue of its canteen-like structure, the apparatus may be carried while exposing the window to the sun's rays. For example, the apparatus may be mounted in mobile modes such as uon a back pack, or horse's saddle, a boat, a bicycle, canoe, snowmobile, or in immobile modes such as upon a tent, tree, or in still other modes typical of outdoor activities.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for confining a supply of water and enabling said water to be heated by solar radiation, said apparatus comprising:
    (a) a water-confining vessel having an panel of spherically rounded contour convexly directed outwardly from the vessel and centered upon an axis perpendicular to said vessel, an opposed lower panel, a boundary of circular configuration joining said upper and lower panels, and a sealable spout communicating with the interior of the vessel,
    (b) a jacket of self-supporting thermally insulative material, and comprised of (1) a bottom wall of circular perimeter adapted to lie in abutment with said lower panel, (2) a sidewall rising upwardly from the perimeter of said bottom wall as a continuous extension thereof and having an exterior surfact extending between upper and lower extremities and an interior surface comprised of a lower portion which faces said vessel and abuts said boundary, and an upper portion disposed above the upper panel of the vessel and shaped as a conical section which tapers outwardly away from the vessel toward the upper extremity of said exterior surface and (3) a channel which permits close-fitting passage of said spout, (c) a circular lens window of larger diameter than siad vessel affixed at its perimeter to the upper extremity of said sidewall and coacting with the jacket to define an air chamber above the vessel, said lens being perpendicularly centered upon the axis of the upper panel and having a focal point coinciding with the center of curvature of said upper panel at a site on said axis below the bottom wall of the jacket, whereby light rays passing through the lens converge to the area of the upper panel while passing through the air chamber, and impinge perpendicularly upon the upper panel and heat the vessel, and (d) a carrying strap forming a substantially closed loop, a part of which embraces the exterior surface of said sidewall.

2. The apparatus of claim 1 wherein a dial thermometer is associated with the vessel.

3. The apparatus of claim 1 wherein said vessel is a monolithic structure of transparent material which allows the solar rays to penetrate into the vessel and heat the water directly.

4. The apparatus of claim 1 wherein the lower panel of said vessel is rounded contour convexly directed outwardly from the vessel and joining with the upper panel at a circular boundary edge.

5. The apparatus of claim 1 wherein the lower panel of said vessel is flat and is joined to the upper panel by a boundary edge panel of circular cylindric configuration perpendicularly disposed between said upper and lower panels.

6. The apparatus of claim 1 wherein rays of light focused from the perimeter of the lens toward the vessel deifne a conical surface which is tangent to the conical section of the interior surface of the sidewall.

7. The apparatus of claim 1 wherein said window lens is a fresnel lens.

* * * * *